United States Patent
Artruc (10) Patent No.: US 10,023,282 B1
(45) Date of Patent: Jul. 17, 2018

(54) GEARS FOR REVERSING ROWING MOTION FOR OARS

(71) Applicant: Randy Artruc, Truro, MA (US)

(72) Inventor: Randy Artruc, Truro, MA (US)

( * ) Notice: Subject to any disclaimer, the term of this patent is extended or adjusted under 35 U.S.C. 154(b) by 0 days.

(21) Appl. No.: 15/677,102

(22) Filed: Aug. 15, 2017

(51) Int. Cl.
*B63H 16/04* (2006.01)
*B63H 16/10* (2006.01)
*F16H 19/00* (2006.01)
*F16H 21/54* (2006.01)

(52) U.S. Cl.
CPC ......... *B63H 16/102* (2013.01); *F16H 19/001* (2013.01); *F16H 21/54* (2013.01)

(58) Field of Classification Search
CPC ...... B63H 16/102; F16H 21/54; F16H 19/001
See application file for complete search history.

(56) References Cited

U.S. PATENT DOCUMENTS

| | | | |
|---|---|---|---|
| 15,794 A | 9/1856 | Rode | |
| 522,545 A | 7/1894 | Wright | |
| 562,369 A | 6/1896 | Berron | |
| 2,415,432 A | 2/1947 | Reinhold | |
| D235,865 S | 7/1975 | Bellis | |
| 3,983,951 A | * 10/1976 | Guerra | B60G 3/26 180/256 |
| 5,112,261 A | * 5/1992 | Humphrey | B63H 16/102 440/103 |

FOREIGN PATENT DOCUMENTS

WO 2005115833 12/2005

* cited by examiner

*Primary Examiner* — Stephen P Avila
(74) *Attorney, Agent, or Firm* — Kyle A. Fletcher, Esq.

(57) ABSTRACT

The gears for reversing the rowing motion for oars is a gearing mechanism configured for use with an oar. The gears for reversing the rowing motion for oars reverses the pulling motion associated with the oar. This reversal of the pulling motion allows the oar to be used normally while the rower faces the bow of a boat. The gears for reversing the rowing motion for oars comprises a drive gear mechanism, a rotation gear mechanism a handle mechanism, an oar mechanism, and a gunwale mount. The drive gear mechanism transfers power from the handle mechanism to the oar mechanism. The gunwale mount attaches the gears for reversing the rowing motion for oars to the gunwale of a boat. The rotation gear mechanism raises and lowers the oar into the water.

19 Claims, 4 Drawing Sheets

GEARS FOR REVERSING ROWING MOTION FOR OARS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of ships and waterborne vessels including marine propulsion systems, more specifically, an inverting mechanism between the handgrip and the blade of a muscle powered propulsion system.

SUMMARY OF INVENTION

The gears for reversing the rowing motion for oars is a gearing mechanism configured for use with an oar. The gears for reversing the rowing motion for oars reverses the pulling motion associated with the oar. This reversal of the pulling motion allows the oar to be used normally while the rower faces the bow of a boat. The gears for reversing the rowing motion for oars comprises a drive gear mechanism, a rotation gear mechanism a handle mechanism, an oar mechanism, and a gunwale mount. The to the oar mechanism. The gunwale mount attaches the gears for reversing the rowing motion for oars to the gunwale of a boat. The rotation gear mechanism raises and lowers the oar into the water.

These together with additional objects, features and advantages of the gears for reversing the rowing motion for oars will be readily apparent to those of ordinary skill in the art upon reading the following detailed description of the presently preferred, but nonetheless illustrative, embodiments when taken in conjunction with the accompanying drawings.

In this respect, before explaining the current embodiments of the gears for reversing the rowing motion for oars in detail, it is to be understood that the gears for reversing the rowing motion for oars is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gears for reversing the rowing motion for oars.

It is therefore important that the claims be regarded as including such equivalent construction insofar as they do not rowing motion for oars. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The gears for reversing the rowing motion for oars 100 (hereinafter invention) is a gearing mechanism configured for use with an oar 161. The invention 100 reverses the pulling motion associated with the oar 161. This reversal of the pulling motion allows the oar 161 to be used normally while the rower faces the bow of a boat 160. The invention 100 comprises a drive gear mechanism 101, a handle 162 mechanism 102, an oar 161 mechanism 103, a gunwale 163 mount 104, and a rotation gear transfers power from the handle 162 mechanism 102 to the oar 161 mechanism 103. The gunwale 163 mount attaches the invention 100 to the gunwale 163 of a boat 160. The rotation gear mechanism 105 raises and lowers the oar 161 into the water.

The boat 160 refers to a manually powered water vessel. The boat 160 is further defined with a gunwale 163. The oar 161 is a shaft with a blade at one end that is used for propelling water vessels. The handle 162 is a shaft that is used to power the invention 100. The gunwale 163 refers to the upper edge of a side of the boat 160.

The drive gear mechanism 101 is a mechanical device that transfers rotation energy from the handle 162 mechanism 102 to the oar 161 mechanism 103 for the purpose of driving the oar 161 to propel the boat 160. The drive gear mechanism 101 comprises a first quarter spherical gear 141 and a second quarter spherical gear 142.

Figure 1:
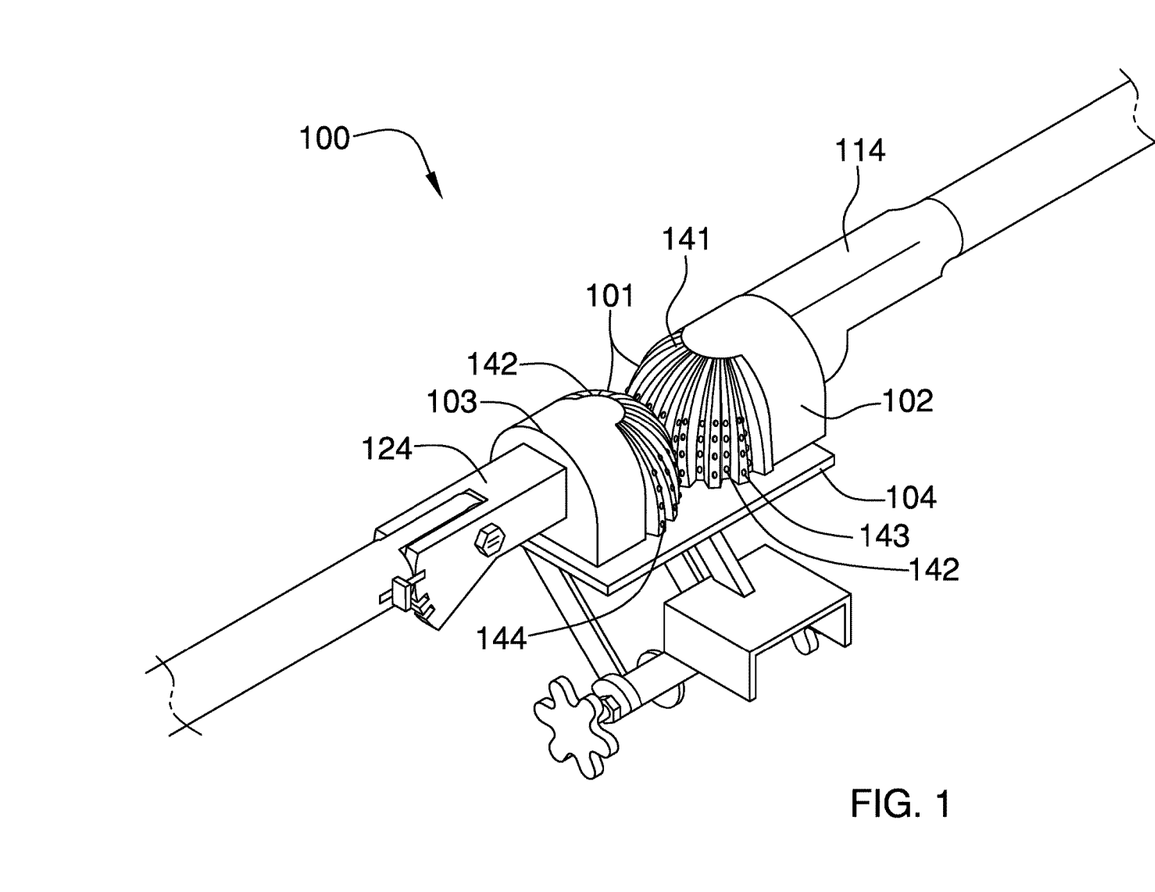
FIG. 1 is a perspective view of an embodiment of the disclosure.
Figure 2:
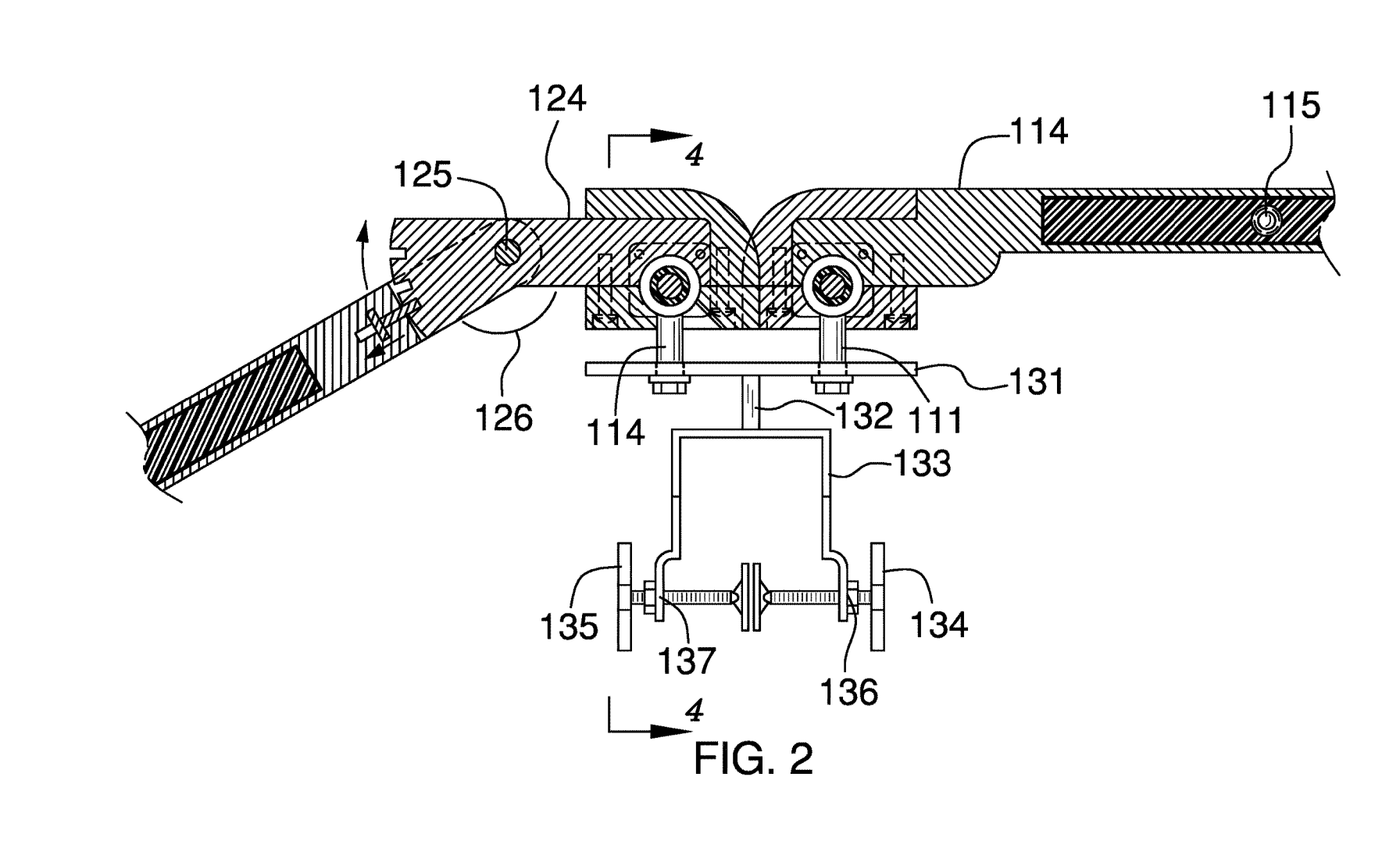
FIG. 2 is a cross-sectional view of an embodiment of the disclosure.
Figure 3:
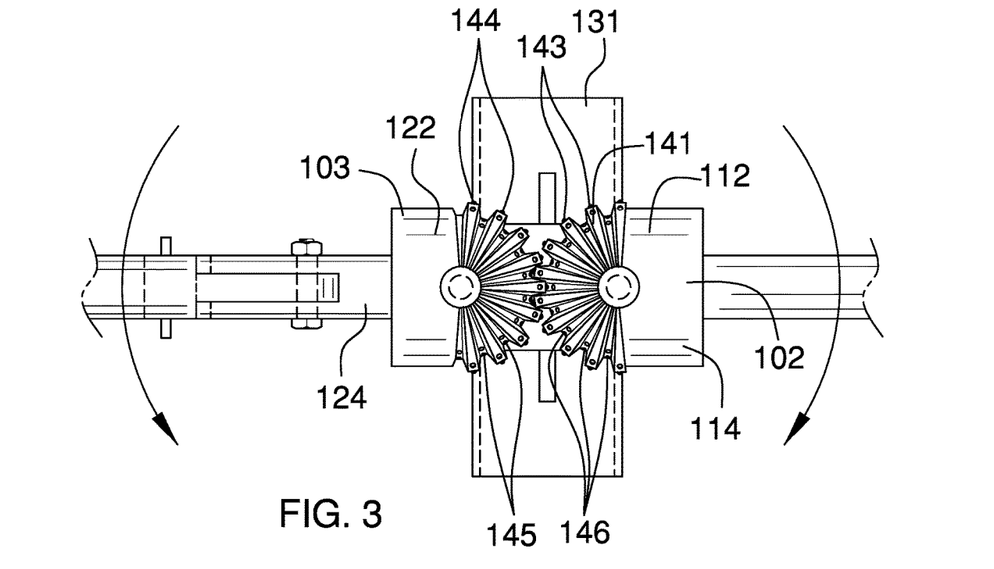
FIG. 3 is a top view of an embodiment of the disclosure.
Figure 4:
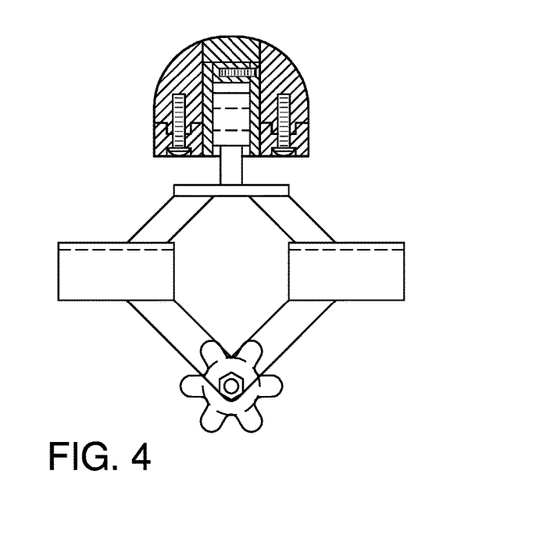
FIG. 4 is a detail view of an embodiment of the disclosure.

As shown most clearly in FIG. 2, the first quarter spherical gear 141 of the drive gear mechanism 101 and the second quarter spherical gear 142 of the drive gear mechanism 101 are meshed such that when the handle 162 mechanism 102 rotates the first quarter spherical gear 141 in a given direction the second quarter spherical gear 142 will rotate in the opposite direction.

The first quarter spherical gear 141 is a gear that is formed upon a base shape of a quarter sphere. The second quarter spherical gear 142 is a gear that is formed upon a base shape of a quarter sphere. The first quarter spherical gear 141 and the second quarter spherical gear 142 are gear structures that are similar to the hemispherical gear construction described in U.S. Pat. No. 5,129,275 as further identified in the IDS associated with this disclosure. The specific gear structure differs from U.S. Pat. No. 5,129,275 in that the construction of the first quarter spherical gear 141 and the second quarter spherical gear 142 are quarter spheres instead of hemispheres.

The first quarter spherical gear 141 further comprises a first plurality of lock pins 143 and a second plurality of lock apertures 146. The second quarter spherical gear further comprises a second plurality of lock pins 144 and a first plurality of lock apertures 145.

Each of the first plurality of lock pins 143: 1) is a cylindrical shaft; 2) is mounted on the edge of a selected tooth of the first quarter spherical gear 141 that is distal from the center axis of the first quarter spherical gear 141; 3) projects radially away from the center axis of the first quarter spherical gear 141; and 4) is sized such that any lock pin inserted into a lock aperture selected from the second plurality of lock apertures 146. Each tooth of the first quarter spherical gear 141 is fitted with a lock pin selected from the first plurality of lock pins 143.

Each of the second plurality of lock pins 144: 1) is a cylindrical shaft; 2) is mounted on the edge of a selected tooth of the second quarter spherical gear 142 that is distal from the center axis of the second quarter spherical gear 142; 3) projects radially away from the center axis of the second quarter spherical gear 142; and 4) is sized such that any lock pin selected from the second plurality of lock pins 144 can be inserted into a lock aperture selected from the first plurality of lock apertures 145. Each tooth of the second quarter spherical gear 142 is fitted with a lock pin selected from the second plurality of lock pins 144.

Each of the first plurality of lock apertures 145: 1) is a negative space formed in the shape of a cylindrical shaft; 2) is formed in the valley between two adjacent teeth selected form in the second quarter spherical gear 142; 3) projects radially towards the center axis of the second quarter spherical gear 142; and 4) is sized such that any lock pin selected from the first plurality of lock pins 143 can be inserted into a lock aperture selected from the first plurality of lock apertures fitted with a lock aperture selected from the first plurality of lock apertures 145.

Each of the second plurality of lock apertures 146: 1) is a negative space formed in the shape of a cylindrical shaft; 2) is formed in the valley between two adjacent teeth selected form in the first quarter spherical gear 141; 3) projects radially towards the center axis of the first quarter spherical gear 141; and 4) is sized such that any lock pin selected from the second plurality of lock pins 144 can be inserted into a lock aperture selected from the second plurality of lock apertures 146. Each valley of the first quarter spherical gear 141 is fitted with a lock aperture selected from the second plurality of lock apertures 146.

The first plurality of lock pins 143 are positioned relative to the second plurality of lock apertures 146 such that the first plurality of lock pins 143 and the second plurality of lock apertures 146 will mesh with each other in coordination of the movements of the first quarter spherical gear 141 and the first quarter spherical gear 141. The second plurality of lock pins 144 are positioned relative to the first plurality of lock apertures 145 such that the second plurality of lock pins 144 and the first plurality of lock apertures 145 will mesh with each other in coordination of the movements of the first quarter The meshing of the first plurality of lock pins 143 and the second plurality of lock apertures 146 and the meshing of the second plurality of lock pins 144 and the first plurality of lock apertures 145 ensures that the operation of the first quarter spherical gear 141 and the first quarter spherical gear 141 will remain on a constant plane.

The handle 162 mechanism 102 is a device that translates the linear motion of the pulled handle 162 into a rotational motion that is used to drive the first quarter spherical gear 141 of the drive gear mechanism 101. The handle 162 mechanism 102 comprises a first stanchion 111, a first support bearing 112, a first linkage 113, a handle 162 mount 114, and a handle 162 lock 115.

The first stanchion 111 is a shaft that is used to raise the handle 162 mechanism 102 above the gunwale 163 mount 104.

The first support bearing 112 is a readily and commercially available bearing that is mounted on the first stanchion 111 such that the first support bearing 112 rotates in a horizontal plane when the oar 161 is in the water. The first support bearing 112 attaches to the first stanchion 111 using a ball and socket joint such that the rotation gear mechanism 105 can rotate the plane of the first support bearing 112. The first quarter spherical gear 141 is mounted on the superior surface of the first support bearing 112 such that the first quarter spherical gear 141 will rotate with the rotation of the first support bearing 112.

The handle 162 mount 114 attaches to the first support bearing 112 in the manner of a cantilever. As shown most clearly in FIGS. 1 and 5, the handle 162 is inserted into the handle 162 mount 114. The handle 162 is used to power the invention 100. The handle 162 lock 115 is a detent that removably attaches the handle 162 to the handle 162 mount 114.

The first linkage 113 is the portion of the rotation gear mechanism 105 that is contained within the handle 162 mechanism 102. As shown most clearly in FIGS. 3 and 4, the first linkage 113 attaches to the second linkage 123. As shown most clearly in FIG. 5, raising the handle 162 in the superior direction causes the first linkage 113 and the second linkage 123 to rotate such that the oar 161 rotates out of the water in the superior direction.

The oar 161 mechanism 103 is a device that translates the rotational motion of the second quarter spherical gear 142 of the drive gear mechanism 101 into a linear motion of the oar 161 that is used to drive the boat 160. The oar 161 mechanism 103 comprises a second stanchion 121, a second support bearing 122, a second linkage 123, an oar 161 mount 124, and a cant adjustment 125. The oar 161 mechanism 103 is further defined with a cant angle 126.

The second stanchion 121 is a shaft that is used to raise the handle 162 mechanism 102 above the gunwale 163 mount 104.

The second support bearing 122 is a readily and commercially available bearing that is mounted on the second stanchion 121 such that the second support bearing 122 rotates in a horizontal plane when the oar 161 is in the water. The second support bearing 122 attaches to the second stanchion 121 using a ball and socket joint such that the rotation gear mechanism 105 can rotate the plane of the second support bearing 122. The second quarter spherical gear 142 is mounted on the superior surface of the second support bearing 122 such that the second quarter spherical gear 142 will rotate with the rotation of the second support bearing 122.

The second linkage 123 is the portion of the rotation gear mechanism 105 that is contained within the oar 161 mechanism 103. As shown most clearly in FIGS. 3 and 4, the second linkage 123 attaches to the first linkage 113.

The oar 161 mount 124 attaches to the second support bearing 122 in the manner of a cantilever. As shown most clearly in FIGS. 1 and 5, the oar 161 is inserted into the oar 161 mount 124. The oar 161 mount 124 attaches to the second support bearing 122 in the manner of a cantilever. As shown most clearly in FIGS. 1 and 5, the oar 161 is inserted into the oar 161 mount 124.

The cant adjustment 125 is a detent that removably attaches the oar 161 to the oar 161 mount 124. The cant angle 126 is a measure of the angle between the oar 161 mount 124 and the center axis of the shaft of the oar 161. The cant adjustment 125 is a readily and commercially available detent, in the manner of a flag pole holder, which incorporates the required facilities to adjust the cant angle 126.

The gunwale 163 mount 104 is a mounting device that attaches the invention 100 to the gunwale 163 of the boat 160. The gunwale 163 mount 104 comprises a mount plate 131, a mount stanchion 132, and a U bracket 133.

As shown most clearly in FIG. 2, the mount plate 131 is a flat metal plate that forms the superior surface of the gunwale 163 mount 104. The first stanchion 111 and the second stanchion 121 attach perpendicularly to the mount plate 131. The mount stanchion 132 is a shaft that attaches the mount plate 131 to the U bracket 133.

The U bracket 133 is a three-sided rectilinear bracket that is sized to be fitted over the gunwale 163 of the boat 160. The U bracket 133 comprises a first tightening bolt 134, a second tightening bolt 135, a first bolt hole 136, and a second bolt hole 137.

The first tightening bolt 134 is a shaft that is formed with an exterior screw thread. The first tightening bolt 134 is threaded through the first bolt hole 136 such that the end of the first tightening bolt 134 presses against the side of the gunwale 163. The second tightening bolt 135 is a shaft that is formed with an exterior screw thread. The second tightening bolt 135 is threaded through the second bolt hole 137 such that the end of the second tightening bolt 135 presses against the side of the gunwale 163.

The first bolt hole 136 is a hole formed through the U bracket 133 that is formed with an interior screw thread and is sized to receive the first tightening bolt 134. The second bolt hole 137 is a hole formed through the U bracket 133 that is formed with an interior screw thread and is sized to receive the second tightening bolt 135.

The rotation gear mechanism 105 is a geared interconnection between the handle 162 mechanism 102 and the oar 161 mechanism 103. As shown most clearly in FIG. 5, the rotation gear mechanism 105 raises the oar 161 out of the water after a stroke such that the oar 161 can be rotated back to its original starting position.

Figure 5:
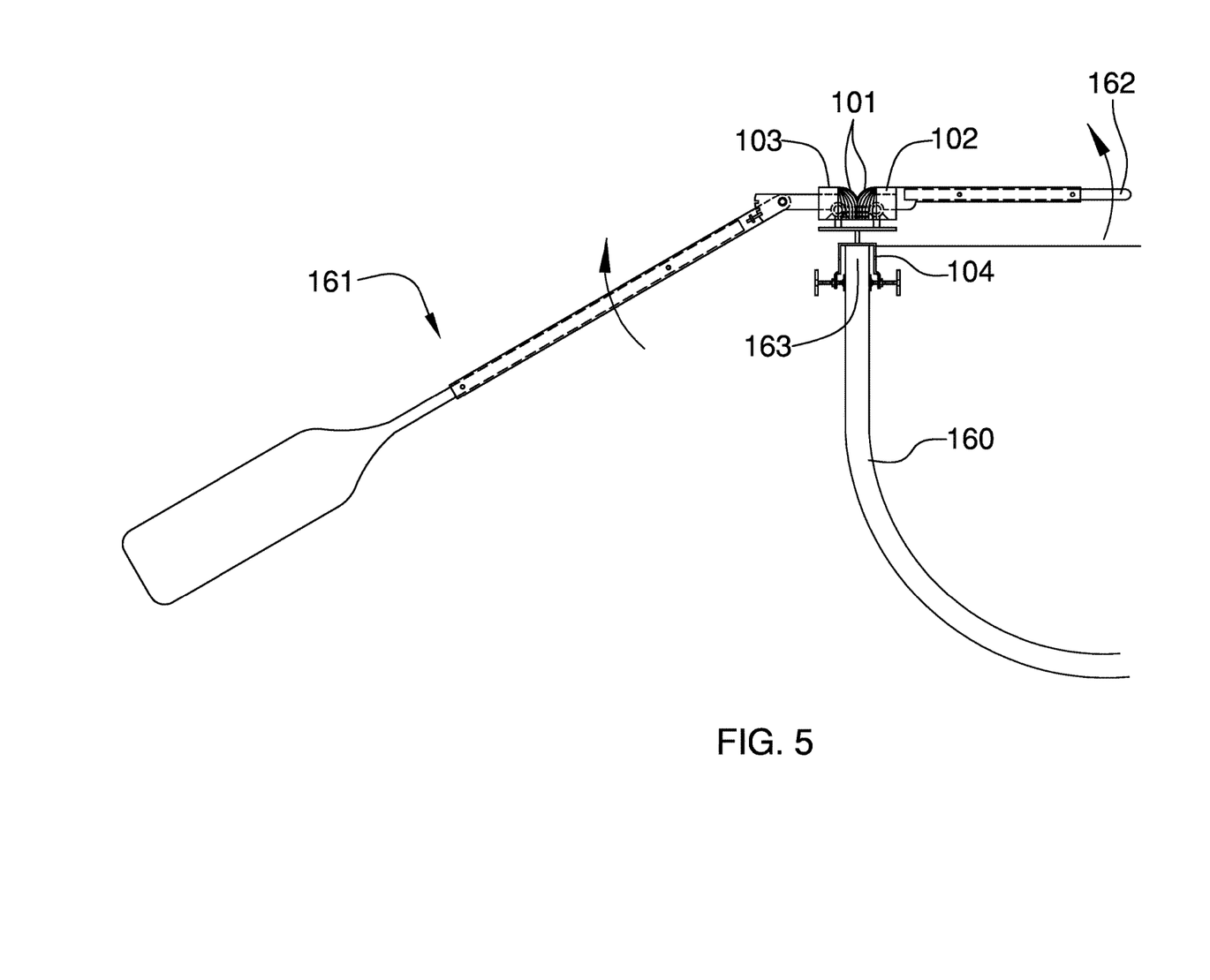
FIG. 5 is an in use view of an embodiment of the disclosure.

The rotation gear mechanism 105 rotates the handle 162 mechanism 102 and the oar 161 mechanism 103 towards each other when the handle 162 is lifted in the vertical direction. This rotation lifts the oar 161 out of the water in a manner that facilitates the return of the oar 161 to its initial position. The rotation gear mechanism 105 is a geared connection between the handle 162 mechanism 102 and the oar 161 mechanism 103. This geared connection is formed between the first linkage 113 and the second linkage 123.

The direct attachment of the first quarter spherical gear 141 to the handle 162 mechanism 102 and the second quarter spherical gear 142 to the oar 161 mechanism 103 causes the first quarter spherical gear 141 and the second quarter spherical gear 142 to rotate relative to each other. The quarter spherical construction of both the first quarter spherical gear 141 and the second quarter spherical gear 142 allows the first quarter spherical gear 141 and the second quarter spherical gear 142 to remain meshed during the operation of the rotation gear mechanism 105.

The first linkage 113 comprises a first bearing gear combination 151 and a second bearing gear combination 152. The second linkage 123 comprises a third bearing gear combination 153 and a fourth bearing gear combination 154.

The first bearing gear combination 151 comprises a gear mounted on a bearing. The bearing is mounted in a fixed position relative to the first stanchion 111 in such a manner that the gear rotates freely. The gear of the first bearing gear combination 151 meshes with the gear of the third bearing gear combination 153 to enable the operation of the rotation gear mechanism 105.

The second bearing gear combination 152 comprises a gear mounted on a bearing. The bearing is mounted in a fixed position relative to the first stanchion 111 in such a manner that the gear rotates freely. The gear of the second bearing gear combination 152 meshes with the gear of the fourth bearing gear combination 154 to enable the operation of the rotation gear mechanism 105.

The first bearing gear combination 151 and the second bearing gear combination 152 are mounted such that a line from the center of first bearing gear combination 151 to the center of the second bearing gear combination 152 is parallel to the gunwale 163. The face of the gear of the first bearing gear combination 151 and the face of the gear of the second bearing gear combination 152 are: 1) parallel to each other; and, 2) parallel to the center axis of the first stanchion 111.

The third bearing gear combination 153 comprises a gear mounted on a bearing. The bearing is mounted in a fixed position relative to the second stanchion 121 in such a manner that the gear rotates freely. The gear of the third bearing gear combination 153 meshes with the gear of the first bearing gear combination 151 to enable the operation of the rotation gear mechanism 105.

The fourth bearing gear combination 154 comprises a gear mounted on a bearing. The bearing is mounted in a fixed position relative to the second stanchion 121 in such a manner that the gear rotates freely. The gear of the fourth bearing gear combination 154 meshes with the gear of the second bearing gear combination 152 to enable the operation of the rotation gear mechanism 105.

The third bearing gear combination 153 and the fourth bearing gear combination 154 are mounted such that: 1) a line from the center of third bearing gear combination 153 to the center of the fourth bearing gear combination 154 is parallel to the gunwale 163; 2) a line from the center of third bearing gear combination 153 to the center of the first bearing gear combination 151 is perpendicular to the gunwale 163; and, 3) a line from the center of fourth bearing gear combination 154 to the center of the second bearing gear combination 152 is perpendicular to the gunwale 163. The third bearing gear combination 153 and the face of the gear of the fourth bearing gear combination 154 are: 1) parallel to each other; and, 2) parallel to the center axis of the second stanchion 121.

The following definitions were used in this disclosure:

Ball and Socket Joint: As used in this disclosure, a ball and socket joint means a manufactured joint or coupling in which a partially spherical object lies in a socket, allowing for multidirectional movement and rotation within limits determined by the construction of the ball and socket joint.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Blade: As used in this disclosure, a blade is a term that is used to describe a wide and flat structure or portion of a larger structure such as a propeller.

Cant: As used in this disclosure, a cant is an angular deviation from one or more reference lines or planes.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Drive: As used in this disclosure, a drive is a mechanism or a device that transmits a motive force from a first device or object to a second device or object with the objective or operating the second object.

Exterior Screw Thread: An exterior screw thread is a ridge wrapped around the outer surface of a tube in the form of a helical structure that is used to convert rotational movement into linear movement.

Gear: As used in this disclosure, a gear is a toothed wheel, cylinder, or other toothed mechanical element that is used to transmit motion, a change of speed, or a change of direction to second toothed wheel, cylinder, or other toothed mechanical element.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Interior Screw Thread: An interior screw thread is a groove that is formed around the inner surface of a tube in the form of a helical structure that is used to convert rotational movement into linear movement.

Negative Space: As used in this disclosure, negative space is a method of defining an object through the use of open or empty space as the definition of the object itself, or, through the use of open or empty space to describe the boundaries of an object.

Shaft: As used in this disclosure, a shaft is a long, narrow and rigid structure that is used as: 1) a structural element of a larger object; or 2) as a grip or lever for a handle. Shafts are often cylindrical in shape.

Stanchion: As used in this disclosure, a stanchion refers to a vertical pole, post, or support.

Superior: As used in this disclosure, the term superior refers to a directional reference that is parallel to and in the opposite direction of the force of gravity.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An inverting mechanism comprising:
   a drive gear mechanism, a handle mechanism, an oar mechanism, a gunwale mount, and a rotation gear mechanism;
   wherein the drive gear mechanism is a mechanism that transfers power from the handle mechanism to the oar mechanism;
   wherein the gunwale mount attaches the inverting mechanism to the gunwale of a boat;
   wherein the boat is a manually powered water vessel;
   wherein the inverting mechanism is a gearing mechanism configured for use with an oar;
   wherein the rotation gear mechanism raises and lowers the oar into the water;
   wherein the inverting mechanism reverses the pulling motion associated with the oar;
   wherein the drive gear mechanism is a mechanical device that transfers rotation energy from the handle mechanism to the oar mechanism for the purpose of driving the oar to propel the boat;
   wherein the drive gear mechanism comprises a first quarter spherical gear and a second quarter spherical gear;

wherein the first quarter spherical gear of the drive gear mechanism and the second quarter spherical gear of the drive gear mechanism are meshed such that when the handle mechanism rotates the first quarter spherical gear in a given direction the second quarter spherical gear will rotate in the opposite direction;

wherein the first quarter spherical gear is a gear that is formed upon a base shape of a quarter sphere;

wherein the second quarter spherical gear is a gear that is formed upon a base shape of a quarter sphere.

2. The inverting mechanism according to claim 1
wherein the handle mechanism is a device that translates the linear motion of the pulled handle into a rotational motion that is used to drive the first quarter spherical gear of the drive gear mechanism;

wherein the handle mechanism comprises a first stanchion, a first support bearing, a first linkage, a handle mount, and a handle lock;

wherein the first support bearing and the first linkage attach to the first stanchion;

wherein the handle mount attach to the first support bearing;

wherein the handle lock attaches to the handle mount;

wherein the first stanchion attaches the handle mechanism to the gunwale mount.

3. The inverting mechanism according to claim 2
wherein the first support bearing is a bearing that is mounted on the first stanchion such that the first support bearing rotates in a horizontal plane when the oar is in the water;

wherein the first quarter spherical gear is mounted on the superior surface of the first support bearing such that the first quarter spherical gear will rotate with the rotation of the first support bearing;

wherein the first support bearing attaches to the first stanchion using a ball and socket joint such that the rotation gear mechanism can rotate the plane of the first support bearing.

4. The inverting mechanism according to claim 3
wherein the handle mount attaches to the first support bearing in the manner of a cantilever;

wherein a handle inserts into the handle mount;

wherein the handle the lever that is used to power the inverting mechanism;

wherein the handle lock is a detent that removably attaches the handle to the handle mount;

wherein the first linkage is a portion of the rotation gear mechanism that is contained within the handle mechanism.

5. The inverting mechanism according to claim 4
wherein the oar mechanism is a device that translates the rotational motion of the second quarter spherical gear of the drive gear mechanism into a linear motion of the oar;

wherein the oar mechanism comprises a second stanchion, a second support bearing, a second linkage, an oar mount, and a cant adjustment;

wherein the oar mechanism is further defined with a cant angle;

wherein the second support bearing and the second linkage attach to the second stanchion;

wherein the oar mount attaches to the second support bearing;

wherein the cant adjustment attaches to the oar mount;

wherein the second stanchion attaches the oar mechanism to the gunwale mount.

6. The inverting mechanism according to claim 5
wherein the second support bearing is a bearing that is mounted on the second stanchion such that the second support bearing rotates in a horizontal plane when the oar is in the water;

wherein the second quarter spherical gear is mounted on the superior surface of the second support bearing such that the second quarter spherical gear will rotate with the rotation of the second support bearing;

wherein the second support bearing attaches to the second stanchion using a ball and socket joint such that the rotation gear mechanism can rotate the plane of the second support bearing.

7. The inverting mechanism according to claim 6
wherein first quarter spherical gear further comprises a first plurality of lock pins and a second plurality of lock apertures;

wherein second quarter spherical gear further comprises a second plurality of lock pins and a first plurality of lock apertures;

wherein the first plurality of lock pins are positioned relative to the second plurality of lock apertures such that the first plurality of lock pins and the second plurality of lock apertures will mesh with each other in coordination of the movements of the first quarter spherical gear and the first quarter spherical gear;

wherein the second plurality of lock pins are positioned relative to the first plurality of lock apertures such that the second plurality of lock pins and the first plurality of lock apertures will mesh with each other in coordination of the movements of the first quarter spherical gear and the first quarter spherical gear;

wherein the meshing of the first plurality of lock pins and the second plurality of lock apertures and the meshing of the second plurality of lock pins and the first plurality of lock apertures ensures that the operation of the first quarter spherical gear and the first quarter spherical gear will remain on a constant plane.

8. The inverting mechanism according to claim 7
wherein each of the first plurality of lock pins is a cylindrical shaft;

wherein each of the first plurality of lock pins is mounted on the edge of a selected tooth of the first quarter spherical gear that is distal from the center axis of the first quarter spherical gear;

wherein each of the first plurality of lock pins projects radially away from the center axis of the first quarter spherical gear;

wherein each of the first plurality of lock pins is sized such that any lock pin selected from the first plurality of lock pins can be inserted into a lock aperture selected from the second plurality of lock apertures;

wherein each tooth of the first quarter spherical gear is fitted with a lock pin selected from the first plurality of lock pins;

wherein each of the second plurality of lock pins is a cylindrical shaft;

wherein each of the second plurality of lock pins is mounted on the edge of a selected tooth of the second quarter spherical gear that is distal from the center axis of the second quarter spherical gear;

wherein each of the second plurality of lock pins projects radially away from the center axis of the second quarter spherical gear;

wherein each of the second plurality of lock pins is sized such that any lock pin selected from the second plurality of lock pins can be inserted into a lock aperture selected from the first plurality of lock apertures;

wherein each tooth of the second quarter spherical gear is fitted with a lock pin selected from the second plurality of lock pins;

wherein each of the first plurality of lock apertures is a negative space formed in the shape of a cylindrical shaft;

wherein each of the first plurality of lock apertures is formed in the valley between two adjacent teeth selected form in the second quarter spherical gear;

wherein each of the first plurality of lock apertures projects radially towards the center axis of the second quarter spherical gear;

wherein each of the first plurality of lock apertures is sized such that any lock pin selected from the first plurality of lock pins can be inserted into a lock aperture selected from the first plurality of lock apertures;

wherein each valley of the second quarter spherical gear is fitted with a lock aperture selected from the first plurality of lock apertures;

wherein each of the second plurality of lock apertures is a negative space formed in the shape of a cylindrical shaft;

wherein each of the second plurality of lock apertures is formed in the valley between two adjacent teeth selected form in the first quarter spherical gear;

wherein each of the second plurality of lock apertures projects radially towards the center axis of the first quarter spherical gear; wherein each of the second plurality of lock apertures wherein each of the second plurality of lock apertures is sized such that any lock pin selected from the second plurality of lock pins can be inserted into a lock aperture selected from the second plurality of lock apertures;

wherein each valley of the first quarter spherical gear is fitted with a lock aperture selected from the second plurality of lock apertures.

9. The inverting mechanism according to claim 8 wherein the oar mount attaches to the second support bearing in the manner of a cantilever;

wherein the oar is inserted into the oar mount;

wherein the cant adjustment is a detent that removably attaches the oar to the oar mount;

wherein the cant angle is a measure of the angle between the oar mount and the center axis of the shaft of the oar;

wherein the second linkage is the portion of the rotation gear mechanism that is contained within the oar mechanism.

10. The inverting mechanism according to claim 9 wherein the cant adjustment adjusts the cant angle.

11. The inverting mechanism according to claim 10 wherein the first linkage attaches to the second linkage;

wherein raising the handle in the superior direction causes the first linkage and the second linkage to rotate such that the oar rotates out of the water in the superior direction.

12. The inverting mechanism according to claim 11 wherein the gunwale mount is a mounting device that attaches the inverting mechanism to the gunwale of the boat;

wherein the gunwale mount comprises a mount plate, a mount stanchion, and a U bracket;

wherein the mount stanchion is a shaft that attaches the mount plate to the U bracket.

13. The inverting mechanism according to claim 12 wherein the mount plate is a flat metal plate that forms the superior surface of the gunwale mount;

wherein the first stanchion and the second stanchion attach perpendicularly to superior side of the mount plate.

14. The inverting mechanism according to claim 13 wherein the U bracket is a three sided rectilinear bracket that is sized to be fitted over the gunwale of the boat;

wherein the U bracket comprises a first tightening bolt, a second tightening bolt, a first bolt hole, and a second bolt hole;

wherein the first bolt hole and the second bolt hole are formed in the U bracket;

wherein the first tightening bolt is inserted through the first bolt hole such that the end of the first tightening bolt presses against the side of the gunwale;

wherein the second tightening bolt is inserted through the second bolt hole such that the end of the second tightening bolt presses against the side of the gunwale.

15. The inverting mechanism according to claim 14 wherein the first tightening bolt is a shaft that is formed with an exterior screw thread;

wherein the second tightening bolt is a shaft that is formed with an exterior screw thread;

wherein the first bolt hole is formed with an interior screw thread;

wherein the first bolt hole is sized to receive the first tightening bolt;

wherein the second bolt hole is formed with an interior screw thread and is sized to receive the second tightening bolt.

16. The inverting mechanism according to claim 15 wherein the rotation gear mechanism is a geared interconnection between the handle mechanism and the oar mechanism;

wherein the rotation gear mechanism rotates the handle mechanism and the oar mechanism towards each other when the handle is lifted in the vertical direction;

wherein the geared connection is formed between the first linkage and the second linkage;

wherein the geared connection causes the first quarter spherical gear and the second quarter spherical gear to rotate relative to each other;

wherein the first quarter spherical gear and the second quarter spherical gear to remain meshed during the operation of the rotation gear mechanism.

17. The inverting mechanism according to claim 16 wherein the first linkage comprises a first bearing gear combination and a second bearing gear combination;

wherein the first bearing gear combination comprises a first gear mounted on a first bearing;

wherein the first bearing is mounted in a fixed position relative to the first stanchion in such a manner that the first gear rotates freely;

wherein the second bearing gear combination comprises a second gear mounted on a second bearing;

wherein the second bearing is mounted in a fixed position relative to the first stanchion in such a manner that the second gear rotates freely;

wherein the first bearing gear combination and the second bearing gear combination are mounted such that a line from the center of first bearing gear combination to the center of the second bearing gear combination is parallel to the gunwale;

wherein the face of the gear of the first bearing gear combination and the face of the gear of the second bearing gear combination are parallel to each other;

wherein the face of the gear of the first bearing gear combination and the face of the gear of the second bearing gear combination are parallel to the center axis of the first stanchion.

18. The inverting mechanism according to claim 17 wherein the second linkage comprises a third bearing gear combination and a fourth bearing gear combination;

wherein the third bearing gear combination comprises a third gear mounted on a third bearing;

wherein the third bearing is mounted in a fixed position relative to the second stanchion in such a manner that the third gear rotates freely;

wherein the fourth bearing gear combination comprises a fourth gear mounted on a fourth bearing;

wherein the fourth bearing is mounted in a fixed position relative to the second stanchion in such a manner that the fourth gear rotates freely;

wherein the third bearing gear combination and the fourth bearing gear combination are mounted such that a line from the center of third bearing gear combination to the center of the fourth bearing gear combination is parallel to the gunwale;

wherein the face of the gear of the third bearing gear combination and the face of the gear of the fourth bearing gear combination are parallel to each other;

wherein the face of the gear of the third bearing gear combination and the face of the gear of the fourth bearing gear combination are parallel to the center axis of the second stanchion.

19. The inverting mechanism according to claim 18 wherein the first gear of the first bearing gear combination meshes with the third gear of the third bearing gear combination to enable the operation of the rotation gear mechanism;

wherein the second gear of the second bearing gear combination meshes with the fourth gear of the fourth bearing gear combination to enable the operation of the rotation gear mechanism.

\* \* \* \* \*